Dec. 19, 1961    R. E. FEARON    3,013,958
ISOTOPIC LABELLING
Filed March 24, 1958

3,013,958
ISOTOPIC LABELLING
Robert E. Fearon, Tulsa, Okla., assignor to Electro Chemical Laboratories Corporation, Tulsa, Okla., a corporation of Delaware
Filed Mar. 24, 1958, Ser. No. 723,460
14 Claims. (Cl. 204—165)

The present invention relates to labelling and more particularly to the isotopic labelling of a substance by the substitution for certain of the atoms of one of the elements contained in the substance of an isotope of that element, the isotope being rare in nature and easily recognizable. This application is a continuation-in-part of application Serial No. 651,104, filed April 5, 1957, now abandoned.

Labelling of substances by isotopic substitution has proven a valuable tool in a variety of fields where radioactive tracing can be used. For example, in biochemistry and radiation chemistry such techniques are extremely useful. The present invention is concerned with labelling by means of isotopes which are available in gaseous form, which are rare in nature and which are easily recognizable. Labelling with gaseous isotopes has heretofore been suggested; for example, it has been suggested that a small quantity of an organic compound be placed in a sealed container together with a small volume of tritium gas and allowed to stand at normal or somewhat elevated temperature for three to ten days. The labelled product is then recovered by distillation, recrystallization or chromatography. The resulting isotopic substitution of tritium atoms for hydrogen atoms has been adequate for analysis.

The principal object of the present invention has been the provision of a novel and improved method of labelling by isotopic substitution.

In particular, it has been an object of the invention to provide such a method which is easy to use, which is rapid, and which produces high activity levels.

The method of the invention involves enclosing a quantity of the substance to be labelled in a sealed container together with a quantity of a gaseous material at a reduced pressure, the gaseous material containing rare isotopic atoms of an element forming a constituent of the substance, and creating in the container an electric field which will accelerate ions of the isotopic atoms toward said substance. The electric field, which is preferably a corona discharge, should be set up so that the isotopic ions are accelerated directly toward the substance to be labelled with sufficient velocity to effect substantial isotopic substitution.

Figure 1:
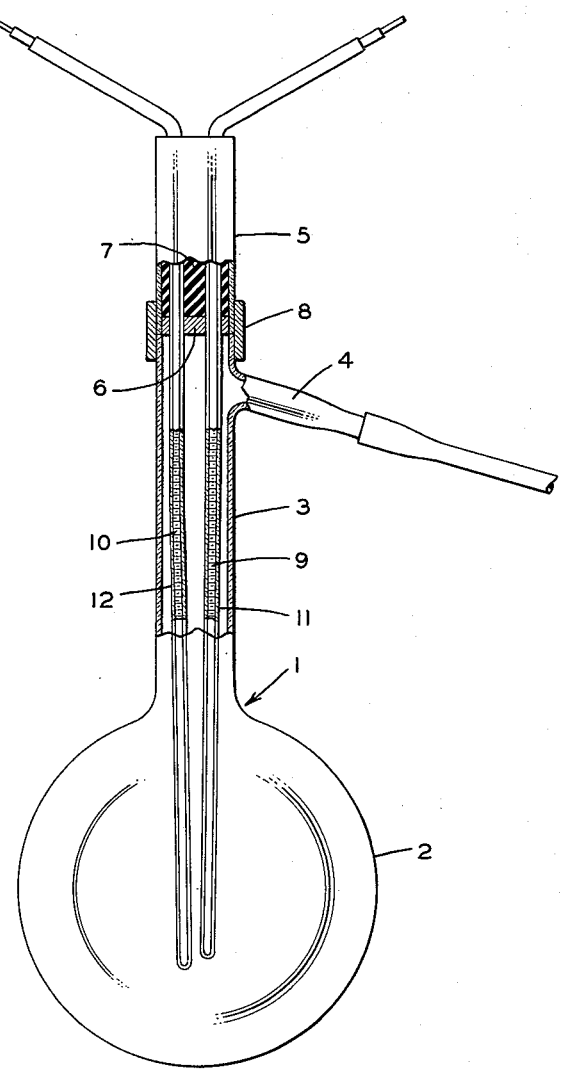
Figure 2:
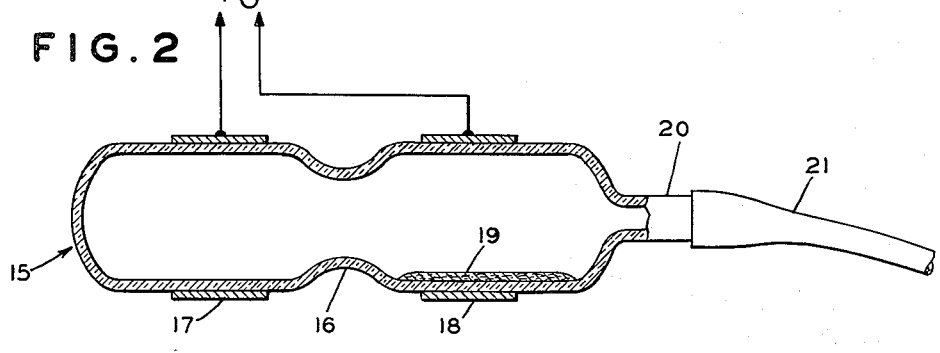

The invention will now be described in greater detail with reference to the appended drawing in which:

FIG. 1 is an elevational view, partly in cross-section, illustrating one suitable form of apparatus for carrying out the invention; and FIG. 2 is a longitudinal sectional view of another form of apparatus for carrying out the invention.

In FIG. 1 there is shown a glass flask 1 having a bulbous lower portion 2 and a narrow elongated neck 3 provided with an exhaust port 4 adjacent its upper end. Mounted directly above the open end of the neck 3 there is provided a glass tube 5 in the lower end of which there is provided a plug 6 which may be made of any suitable electrically insulating material which will not react with the chemicals to be used in the flask 1. The plug 6 may conveniently be made of Teflon, which is a tetrafluoroethylene polymer. Above the plug 6 the glass tube 5 contains another electrically insulating material 7. The neck 3 and the tube 5 are joined by a vacuum-tight tape 8.

A pair of electrodes 9 and 10 extend through the insulator 7 and the plug 6 and pass through the neck 3 and into the portion 2 in spaced relation. The electrodes 9 and 10 are preferably formed from mercury sealed in glass envelopes 11 and 12, respectively.

The substance to be labelled should be in a solid or liquid state and in a form capable of being retained on or adjacent to the surface of an insulator surrounding an electrode or otherwise effectively preventing contact between the substance and the electrode. With the construction shown in FIG. 1, which is only one example of a suitable apparatus for carrying out the invention, the substance to be labelled may be spread in a thin layer over the lower ends of one or both of the glass envelopes 11 and 12. Depending, of course, upon the energy of the substituting isotopic ions, only the surface portions of the substance to be labelled will achieve any appreciable isotopic substitution. Accordingly, it is desirable usually for the substance to be spread in a very thin layer. The external ends of the electrodes 9 and 10 may be connected to a suitable source of potential.

With the substance to be labelled spread on the insulator adjacent the electrode or electrodes, the flask 1 should be filled with a gas at low pressure. The flask 1 may first be evacuated through the port 4 and the gas may then enter through this port. The gas should be one which contains atoms of a rare isotope of an element contained in the substance. The gas is preferably of relatively high purity. The gas pressure should be selected so as to facilitate maintenance of a stable corona discharge and might be, for example, of the order of two centimeters of mercury absolute for an electrode structure of the type shown and with a gas such as tritium.

The substance to be labelled need not be a pure compound but may be a mixture of compounds so long as it contains atoms which may be substituted by available rare and readily identifiable isotopes. For example, so long as the substance contains hydrogen, labelling may be effected with tritium or deuterium gas. In the case of tritium substitution, the labelled substance can be recognized by the beta rays emitted by the tritium atoms. In case a compound of hydrogen is labelled with the hydrogen isotope called deuterium, the presence of the deuterium in the labelled product can be determined by producing all the hydrogen from a sample of the compound, and examining the infrared band spectrum of a compound of the hydrogen so produced. Fluorine deuteride molecules may be recognized and their concentration determined quantitatively by their distinctive infrared absorption spectrum, which is very different from the infrared absorption spectrum of fluorine protide. The terms "protium" and "protide" are used as a name for an atom of common hydrogen of atomic weight 1.008.

In the case of substances containing carbon, substitution of carbon$^{13}$ or carbon$^{14}$ atoms can be made for some of the carbon$^{12}$ atoms of the substance to be labelled. The carbon$^{13}$ or carbon$^{14}$ may be provided in the form of carbon monoxide (CO) or cyanogen $(CN)_2$. Recognition of the carbon$^{14}$ is readily feasible since it is radioactive. The presence of a labelling of carbon$^{13}$ may be determined by converting all of the carbon in a quantity of sample into carbon monoxide, and measuring the infrared band absorption spectrum of the carbon monoxide so produced. The assay of carbon$^{13}$ is thus generally analogous to the assay of deuterium, previously described. At the present time tritium, the cost per curie of which is relatively small, is preferred for labelling, especially since very small quantities can be detected and measured by readily available techniques.

The electric field in the space between the electrodes should be great enough to produce an ionizing discharge, at the gas pressure used, and is preferably great enough to produce a corona discharge. For example, satisfactory results have been obtained with a voltage of 21 kilovolts peak at 60 cycles. Higher or lower frequencies may be used. Higher frequencies tend to decrease the time needed for satisfactory labelling, but also tend to increase the heat generation. By careful selection of the operating conditions, e.g., pressure, electrode diameter, electrode spacing, peak voltage and frequency, labelling can be effected with a minimum generation of heat and in fact substances which must be kept at low temperatures can be labelled.

The electric field set up in the gas between the electrodes accelerates the gas molecules toward the electrodes. Some of the molecules are ionized by the electric field potential, the ions and electrons being accelerated in opposite directions. When the kinetic energy relationships are correct, isotopic ions striking the corresponding atoms of the substance to be labelled will become substituted for such atoms. While obviously a relatively small percentage of isotopic ions will become substituted, on a statistical basis the effective substitutions which occur in a period of about three hours are adequate for satisfactory labelling. Substitution will occur when the kinetic energy of an isotopic ion is adequate to displace an atom from a molecule of the substance but is insufficient for the isotopic ion thereafter to escape from the molecule.

Since too great an ion acceleration will result in excess generation of heat, the voltage applied to the electrodes is preferably not materially greater than is necessary for creation and maintenance of a stable corona discharge. The electric field is preferably set up so that the ions are accelerated in a direction normal to the surface of the substance to be labelled. In the apparatus illustrated in FIG. 1 this result is achieved by having electrodes of circular cross-section encased in glass insulators of circular cross-section. The electrodes should be physically separated from the gas since the free electrons which would be emitted by a metal electrode would prevent satisfactory isotopic substitution. The glass insulators 11 and 12 perform this function. The insulators used should be inert to the chemicals contained in the flask and should not break down in the strong electric field used. Glass is a highly satisfactory insulator for this purpose, but some ceramic materials such as hard porcelain may be used.

The walls of the glass flask itself may be the insulator separating the electrodes from the inside of the ionizing chamber. In such case the electrodes should be arranged to produce an electric field normal to a surface of the chamber and the substance to be labelled will be coated on this surface. A suitable apparatus of this type is shown in FIG. 2.

In FIG. 2, which is a longitudinal sectional view, the reference number 15 designates a glass cylinder having a slightly constricted neck 16 midway between the ends. A conductive metal cylinder 17 is arranged adjacent the outer surface of the glass wall on one side of the neck 16 and a metal cylinder 18 is arranged adjacent the outer surface of the glass wall on the other side of the neck 16, the cylinders 17 and 18 serving as electrodes. The electrodes are connected to a source of alternating current. A layer 19 of material to be labelled is provided on the inner surface of the cylinder 15 adjacent the electrode 18. The glass cylinder 15 is closed at both ends except for a port 20 which is connected to a tube 21. The tube 21 and port 20 serve for evacuating the cylinder and introducing the material to be labelled and the labelling gas.

There will now be described a specific example of the invention. In this example, apparatus as shown in FIG. 2 was used. The cylinder 15 was 10 cm. long and 3 cm. in diameter except for the neck 16 which reduced to about 2 cm. in diameter. The glass wall of the cylinder 15 was 2 mm. thick. The electrodes 17 and 18 were connected to a source of 60 cycle current of 15 kv. R.M.S. About 500 mg. of the substance to be labelled, a higher aliphatic amine mixture, was coated on the inner surface of the cylinder 15, as shown at 19. Five curies of $H^3$ were introduced into the cylinder, the pressure being about 2 cm. of mercury absolute. The material was processed, as described, for a period of three hours and resulted in a labelling of the 500 mg. of material 19 of about 10 millicuries. The labelling was, in large part, not exchangeable with the hydrogen of inert water. Thus the labelled material was exposed for long periods of time to inert water and exhibited no substantial loss of activity.

While the invention has been described in connection with specific embodiments thereof and in a specific use, various modifications thereof will occur to those skilled in the art without departing from the spirit and scope of the invention as set forth in the appended claims.

What is claimed is:

1. The method of substituting isotopic atoms of an element for atoms of the element contained in an organic substance in nongaseous form, comprising the steps of enclosing said substance together with a gaseous material at reduced pressure in a sealed container, said material containing isotopic atoms of an element contained in said substance, said isotopic atoms being rare in nature and being readily recognizable, creating in said container an electric field which will ionize said gas and accelerate ions of said isotopic atoms toward said substance, and maintaining said electric field in said container to substitute some of said isotopic atoms of the element from said gaseous material for some of the atoms of the element in said substance and to fix the substituted atoms therein.

2. The method of substituting radioactive isotopic atoms of an element for atoms of the atoms contained in an organic substance in nongaseous form, comprising the steps of enclosing said substance together with a gaseous material at reduced pressure in a sealed container, said material containing radioactive isotopic atoms of an element contained in said substance, creating in said container an electric field which will ionize said gas and accelerate ions of said isotopic atoms toward said substance, and maintaining said electric field in said container to substitute some of said radioactive isotopic atoms of the element from said gaseous material for some of the atoms of the element in said substance and to fix the substituted radioactive isotopic atoms therein.

3. The method of substituting isotopic atoms of an element for atoms of the element contained in an organic substance in nongaseous form, comprising the steps of enclosing said substance together with a gaseous material at reduced pressure in a sealed container, said material containing isotopic atoms of an element contained in said substance, said isotopic atoms being rare in nature and being readily recognizable, creating in said container an electric field which will ionize said gas and accelerate ions of said isotopic atoms toward said substance, said electric field extending in a direction normal to a surface of said substance whereby said isotopic atoms will strike said surface substantially prependicularly, and maintaining said electric field in said container to substitute some of said isotopic atoms of the element from said gaseous material for some of the atoms of the element in said substance and to fix the substituted atoms therein.

4. The method of labelling an organic substance in nongaseous form, comprising the steps of enclosing said substance together with a gaseous material at reduced pressure in a sealed container, said material containing isotopic atoms of an element contained in said substance, said isotopic atoms being rare in nature and being readily recognizable, creating in said container an electric field which will produce a corona discharge therein thereby to accelerate ions of said isotopic atoms toward said substance, and maintaining said corona discharge in said container to substitute some of said isotopic atoms of the element from said gaseous material for some of the atoms of the element in said substance and to fix the substituted atoms therein.

5. The method of labelling an organic substance in nongaseous form with isotopic atoms of an element, comprising the steps of enclosing said substance together with a gaseous material at reduced pressure in a sealed container, said material containing isotopic atoms of an element contained in said substance, said isotopic atoms being rare in nature and being readily recognizable, creating in said container an electric field which will accelerate ions of said isotopic atoms toward said substance with a velocity sufficient to effect a significant substitution of isotopic ions for corresponding atoms in said substance, and maintaining said electric field in said container to substitute some of said isotopic atoms of the element from said gaseous material for some of the atoms of the element in said substance and to fix the substituted atoms therein.

6. The method of labelling a hydrogen-containing substance in nongaseous form, comprising the steps of enclosing said substance together with a gaseous isotope of hydrogen at reduced pressure in a sealed container, creating in said container an electric field which will accelerate ions of said isotopic atoms toward said substance with a velocity sufficient to effect a significant substitution of isotopic ions for hydrogen atoms in said substance, and maintaining said electric field in said container to substitute some of said ions of said isotopic atoms for some of the hydrogen atoms in said substance and to fix the substituted isotopic atoms therein.

7. The method of labelling a carbon-containing substance in nongaseous form, comprising the steps of enclosing said substance together with a gaseous compound of an isotope of carbon at reduced pressure in a sealed container, creating in said container an electric field which will accelerate ions of said isotopic atoms toward said substance with a velocity sufficient to effect a significant substitution of isotopic ions for carbon atoms in said substance, and maintaining said electric field in said container to substitute some of said ions of said isotopic atoms for some of the carbon atoms in said substance and to fix the substituted ions of said isotopic atoms therein.

8. The method of labelling a hydrogen-containing substance in nongaseous form, comprising the steps of enclosing said substance together with a quantity of tritium gas at reduced pressure in a sealed container, creating in said container an electric field which will produce a corona discharge in said gas to accelerate tritium ions from said tritium gas toward said substance with a velocity sufficient to effect a significant substitution of tritium ions for hydrogen ions in said substance, and maintaining said electric field in said container to substitute some of said tritium ions from said gas for some of the hydrogen ions in said substance and to fix the substituted tritium ions therein.

9. The method set forth in claim 8 in which said corona discharge accelerates said tritium ions in a direction substantially normal to a surface of said substance.

10. The method set forth in claim 8 in which said reduced pressure is of the order of 2 centimeters of mercury absolute.

11. The method of substituting isotopic atoms of an element for atoms of the element contained in an organic substance in nongaseous form, comprising the steps of providing a layer of said substance on the surface of an electrical insulator, sealing said layer in a container containing a gas at low pressure, said gas containing isotopic atoms of an element contained in said substance, said isotopic atoms being rare in nature and being readily recognizable, creating a corona discharge in said gas by creating a high potential electric field extending through said insulator and said layer thereby to ionize said gas and to accelerate said isotopic ions toward said layer, and maintaining said high potential electric field to substitute some of said isotopic atoms of the element from said gas for some of the atoms of the element contained in said substance and to fix the substituted isotopic atoms therein.

12. The method of labelling an organic substance in nongaseous form, comprising the steps of providing a layer of said substance on the surface of an electrical insulator, sealing said layer in a container containing a gas at low pressure, said gas containing isotopic atoms of an element contained in said substance, said isotopic atoms being rare in nature and being readily recognizable, creating a corona discharge in said gas by creating a high potential electric field extending through said insulator and said layer, said electric field at the surface of said layer being substantially normal to said layer whereby isotopic ions accelerated toward said layer strike said layer substantially perpendicularly, and maintaining said corona discharge in said gas to substitute some of the isotopic atoms of the element from said gas for some of the atoms of the element contained in said substance and to fix the substituted isotopic atoms therein.

13. The method of labelling an organic substance in nongaseous form, comprising the steps of providing layers of said substance on the surfaces of a pair of glass tubes, said glass tubes containing metallic electrodes, sealing said tubes in a container containing a gas at low pressure, said gas containing isotopic atoms of an element contained in said substance, said isotopic atoms being rare in nature and being readily recognizable, creating a corona discharge in said gas by supplying a high potential alternating voltage to said electrodes thereby to ionize said gas and to accelerate the resulting isotopic atoms toward said layers, and maintaining said corona discharge in said gas to substitute some of said isotopic atoms from said gas for some of the atoms of the element contained in said substance and to fix the substituted isotopic atoms therein.

14. The method of labelling a hydrogen-containing substance in nongaseous form, comprising the steps of providing a layer of said substance on the surface of an electrical insulator, sealing said layer in a container containing tritium gas at low pressure, creating a corona discharge in said gas by creating a high potential electric field extending through said insulator and said layer, and maintaining said high potential electric field through said insulator to maintain said corona discharge in said gas to substitute some of the atoms from said tritium gas for hydrogen atoms contained in said substance and to fix the substituted tritium atoms in said substance.

References Cited in the file of this patent

UNITED STATES PATENTS 2,855,349     Libby et al. _____ Oct. 7, 1958

OTHER REFERENCES

Transactions of Faraday Society, vol. 23 (1927), pages 60 and 61.

Schlesinger et al.: Journal Amer. Chem. Soc., vol. 53 (December 1931), pp. 4321–22.

Brown et al.: Journal Amer. Chem. Soc., vol. 74 (1952), pp. 1343–44.

Wilzbach: Journal of American Chemical Society, vol. 79 (1957), page 1013.